US012410792B2

(12) United States Patent
Uetsuji et al.

(10) Patent No.: US 12,410,792 B2
(45) Date of Patent: Sep. 9, 2025

(54) UNIAXIAL ECCENTRIC SCREW PUMP

(71) Applicant: HEISHIN Ltd., Hyogo (JP)

(72) Inventors: Eiji Uetsuji, Shiga (JP); Noriaki Sakakihara, Osaka (JP)

(73) Assignee: HEISHIN Ltd., Hyogo (JP)

( * ) Notice: Subject to any disclaimer, the term of this patent is extended or adjusted under 35 U.S.C. 154(b) by 0 days.

(21) Appl. No.: 18/727,074

(22) PCT Filed: Sep. 20, 2022

(86) PCT No.: PCT/JP2022/034893
§ 371 (c)(1),
(2) Date: Jul. 6, 2024

(87) PCT Pub. No.: WO2023/139844
PCT Pub. Date: Jul. 27, 2023

(65) Prior Publication Data

US 2025/0154952 A1 May 15, 2025

(30) Foreign Application Priority Data

Jan. 18, 2022 (JP) ................................ 2022-005901

(51) Int. Cl.
*F04C 2/107* (2006.01)

(52) U.S. Cl.
CPC ........ *F04C 2/1075* (2013.01); *F04C 2230/91* (2013.01); *F05C 2253/12* (2013.01)

(58) Field of Classification Search
CPC .... F04C 2/107; F04C 2/1075; F04C 2230/91; F04C 15/0003; F04C 2250/30; F05C 2253/12
USPC ........................................................... 418/48
See application file for complete search history.

(56) References Cited

U.S. PATENT DOCUMENTS 4,863,359 A 9/1989 Unterstrasser et al.
5,120,204 A * 6/1992 Mathewson .......... F04C 2/1073 418/48
5,318,416 A * 6/1994 Hantschk ................ F04C 14/28 418/153
6,158,988 A * 12/2000 Jager ..................... F04C 2/1075 29/888.023

(Continued)

FOREIGN PATENT DOCUMENTS

DE 102013109829 A1 * 3/2015 ........... F04C 2/1073
JP 62-20684 A 1/1987

(Continued)

OTHER PUBLICATIONS

DE102013109829 Translation (Year: 2013).*
International Search Report for corresponding Application No. PCT/JP2022/034893, mailed Nov. 1, 2022.

*Primary Examiner* — Jesse S Bogue
(74) *Attorney, Agent, or Firm* — Renner, Otto, Boisselle & Sklar, LLP.

(57) ABSTRACT

A uniaxial eccentric screw pump includes a stator having an insertion hole with an inner peripheral surface being internally threaded, and a rotor including a shaft being externally threaded and placed through the insertion hole in the stator. The stator has the insertion hole being an opening in a cross section, the opening includes a middle area and two end areas, and the middle area has lower contact pressure at least in a middle of the middle area than at two ends of the middle area.

8 Claims, 16 Drawing Sheets

(56) References Cited

U.S. PATENT DOCUMENTS

| | | | | |
|---|---|---|---|---|
| 6,336,796 B1 * | 1/2002 | Cholet | .................. | F04C 2/1075 418/179 |
| 7,316,548 B2 * | 1/2008 | Jager | ..................... | F04C 2/1075 415/72 |
| 9,482,223 B2 * | 11/2016 | Jarvis | .................. | F04C 15/0042 |
| 2010/0092317 A1 * | 4/2010 | Suhara | ................ | F16C 32/0429 418/48 |

FOREIGN PATENT DOCUMENTS

| | | |
|---|---|---|
| JP | 2005-344587 A | 12/2005 |
| JP | 2016-079971 A | 5/2016 |

* cited by examiner

UNIAXIAL ECCENTRIC SCREW PUMP

CROSS-REFERENCE TO RELATED APPLICATIONS

This is a national phase application in the United States of International Patent Application No. PCT/JP2022/034893 with an international filing date of Sep. 20, 2022, which claims priority of Japanese Patent Application No. 2022-005901 filed on Jan. 18, 2021 the contents of which are incorporated herein by reference.

TECHNICAL FIELD

The present invention relates to a uniaxial eccentric screw pump.

BACKGROUND ART

A known uniaxial eccentric screw pump includes a stator having an insertion hole with its inner peripheral surface internally threaded and a rotor including an externally threaded shaft placed through the insertion hole in the stator (refer to, for example, Japanese Unexamined Patent Application Publication No. 2005-344587).

In the known uniaxial eccentric screw pump, the rotor and the stator have, between them, substantially the same contact pressure value when the rotor is located in two end areas in an opening that is the cross section of the insertion hole in the stator and when the rotor is located in a middle area in the opening.

When the contact pressure is sufficiently high, the rotor uses higher torque and a greater driving force to rotate.

However, the contact pressure decreased to facilitate movement of the rotor can lower the sealing tightness, causing inappropriate delivery of a fluid.

The inventors have noticed that the contact pressure can be relatively low in the middle area when the contact pressure is sufficient in the two end areas, and have developed a uniaxial eccentric screw pump according to one or more aspects of the present invention.

PRIOR ART DOCUMENTS

Patent Documents

Patent Document 1: Japanese Unexamined Patent Application Publication No. 2005-344587

SUMMARY OF THE INVENTION

Problems to be Solved by the Invention

One or more aspects of the present invention are directed to a uniaxial eccentric screw pump with the sealing tightness and the driving force for rotating a rotor adjustable as appropriate.

Solutions to the Problems

A uniaxial eccentric screw pump according to an aspect of the present invention includes a stator having an insertion hole with an inner peripheral surface being internally threaded, and a rotor including a shaft being externally threaded and placed through the insertion hole in the stator. The stator has the insertion hole being an opening in a cross section. The opening includes a middle area having lower contact pressure at least in a middle of the middle area than at two ends of the middle area.

In this structure, when the rotor moves in the middle area with eccentric rotation, the rotor receives lower contact pressure from the stator in the middle of the middle area than at the two ends of the middle area. The rotor thus generates less friction and uses a gradually decreased driving force to rotate as the rotor moves toward the middle. Conversely, when the rotor is located in two end areas in the opening, the rotor receives higher contact pressure from the stator than in the middle area and achieves tighter sealing.

A uniaxial eccentric screw pump according to an aspect of the present invention includes a stator having an insertion hole with an inner peripheral surface being internally threaded, and a rotor including a shaft being externally threaded and placed through the insertion hole in the stator. The stator has the insertion hole being an opening in a cross section. The opening includes a middle area and two end areas. The two end areas include respective ends being boundary portions adjacent to the middle area. At least one of the boundary portions has higher sealing tightness than at least a middle of the middle area.

In this structure, when the rotor is located in the two end areas during eccentric rotation, the fluid can be delivered more reliably with the boundary portions that have tighter sealing than the middle of the middle area. Conversely, when the rotor moves in the middle area that has lower sealing tightness than the boundary portions, the rotor uses a less driving force to rotate.

The middle area may have a lower elastic modulus at least in the middle of the middle area than at two ends of the middle area.

In this structure, the rotor receives a less force from the stator and generates less friction as the rotor moves from one of the two ends toward the middle of the middle area of the stator. The rotor can thus smoothly move with eccentric rotation.

The middle of the middle area may be covered with a coating layer having a lower elastic modulus than at the two ends of the middle area.

This structure allows the rotor to move with eccentric rotation more smoothly in the middle of the middle area than at the two ends of the middle area.

The two ends of the middle area may be covered with a coating layer having a higher elastic modulus than in the middle of the middle area.

In this structure, the rotor touching the coating layer achieves sufficient sealing tightness when the rotor is located at the two ends of the middle area.

The stator may include an outer cylinder and a stator body inside the outer cylinder. In this case, the stator body may be thinner at least in portions of the two end areas adjacent to the middle area than in the middle area in a normal direction.

In this structure, the outer cylinder reduces outward deformation of the stator body. The stator body is thinner at least in portions of the two end areas adjacent to the middle area than in the middle area. With the outer cylinder, the stator body in the thinner portions is more rigid than in the middle area and thus less likely to deform when the rotor is located in these portions. In other words, the structure achieves tighter sealing in the portions of the two end areas adjacent to the middle area, and also achieves smoother movement in the middle area.

The stator may have a larger difference between a thickness in the middle of the middle area and a thickness at least at one of respective ends of the two end areas being boundary portions adjacent to the middle area than when the stator has a cross section with a shape of a perfect circle and has, in the cross section, an insertion hole being an opening with a shape of a racetrack including semicircles and straight lines.

The stator may be thicker at two ends of the middle area than in the middle of the middle area by a greater degree than when the stator has a cross section with a shape of a perfect circle and has, in the cross section, an insertion hole being an opening with a shape of a racetrack including semicircles and straight lines.

The stator may consist of a stator body made of an elastic material.

In this case, the stator body may be thicker at least at two ends of the middle area than in the middle of the middle area.

Effects of the Invention

The uniaxial eccentric screw pump according to the above aspects of the present invention has the sealing tightness and the driving force for rotating the rotor adjustable as appropriate.

DETAILED DESCRIPTION

Embodiments of the present invention will now be described with reference to the accompanying drawings. The terms for specific directions or positions (e.g., terms including up, down, side, and end) are used herein as appropriate to facilitate understanding of the present invention with reference to the drawings. However, such terms do not limit the technical scope of the present invention. The embodiments described below are mere examples and are not intended to limit the scope of the present invention and its applications or uses. The drawings are schematic and are not drawn to scale relative to the actual size of each component.

Figure 1:
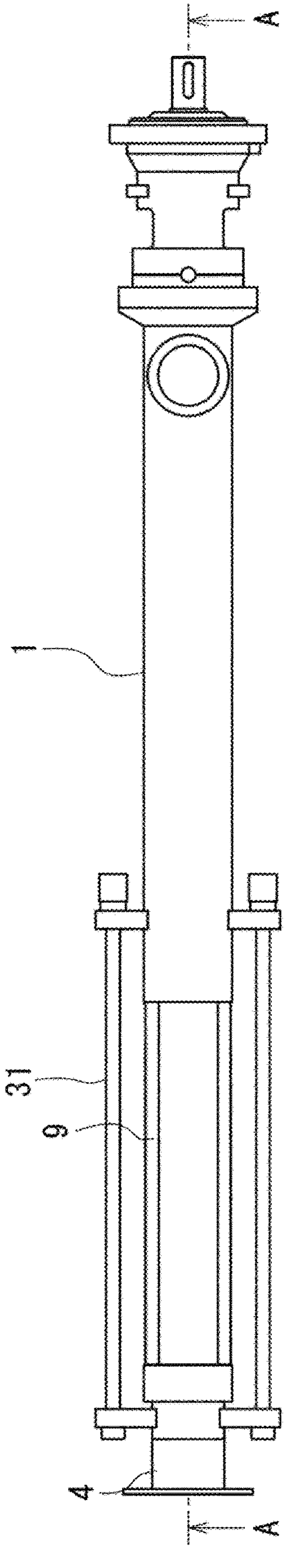
FIG. 1 is a schematic front view of a uniaxial eccentric screw pump according to an embodiment.
Figure 2:
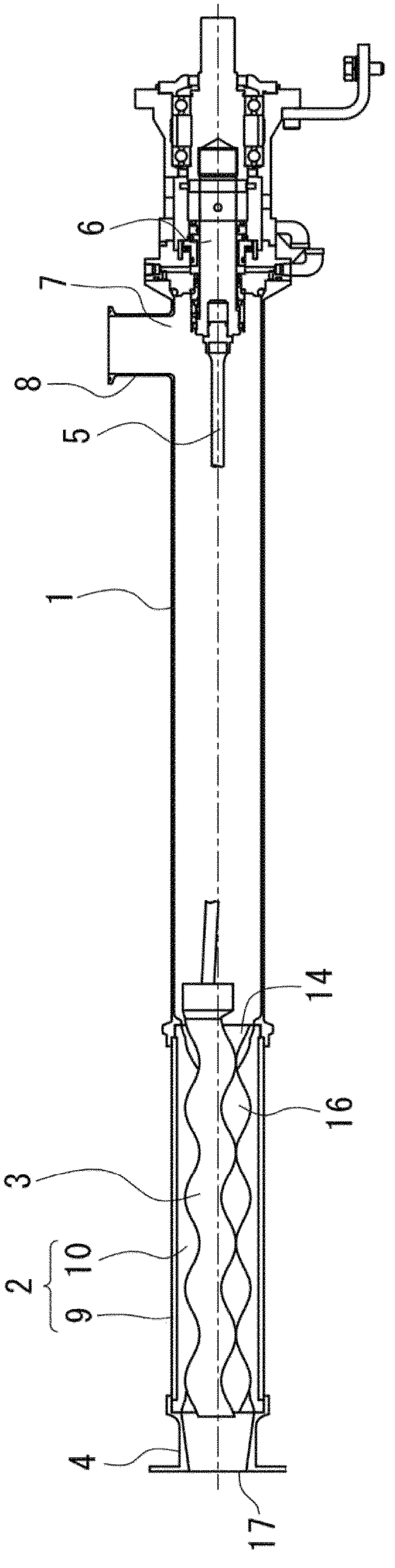
FIG. 2 is a longitudinal sectional view of the uniaxial eccentric screw pump in FIG. 1.

FIG. 1 is a front view of a uniaxial eccentric screw pump as an example of a rotary positive-displacement pump. FIG. 2 is a sectional view (longitudinal sectional view) taken along line A-A in FIG. 1. The uniaxial eccentric screw pump includes a casing 1, a drive (not shown) at one end of the casing 1, and a stator 2, a rotor 3, and an end stud 4 at the other end of the casing 1.

The casing 1 is tubular and is formed from a metal material. The casing 1 accommodates a coupling rod 5. The coupling rod 5 has one end connected to a coupling 6 to receive a driving force from the drive (not shown). The casing 1 has a first opening 7 in its outer peripheral surface at one end. The first opening 7 is connected to a connection tube 8. The connection tube 8 carries a fluid (e.g., a viscous material such as mayonnaise) from, for example, a tank (not shown) to feed the fluid into the casing 1.

The stator 2 includes an outer cylinder 9 and a stator body 10. The outer cylinder 9 and the stator body 10 may be fixed to each other with an adhesive or by pressure welding.

The stator body 10 is tubular (e.g., cylindrical) and is formed from an elastic material. Examples of the elastic material include nitrile rubber, fluorine rubber, ethylene-propylene rubber, styrene-butadiene rubber, silicone rubber, and fluorosilicone rubber. Any of these elastic materials may be selected as appropriate for the material (fluid) to be transferred. The stator 2 has an insertion hole 14 in its center. The insertion hole 14 has an inner peripheral surface including a single or multiple internally threaded portions with an n-start thread (a two-start thread in this example).

The rotor 3 is a shaft formed from a metal material and includes a single or multiple externally threaded portions with an (n−1)-start thread (a single-start thread in this example). The rotor 3 has a cross section with the shape of a perfect circle. The rotor 3 is received in the insertion hole 14 in the stator 2 to define transfer spaces 16 continuous with one another in the longitudinal direction. The rotor 3 has one end connected to the coupling rod 5 in the casing 1. The rotor 3 rotates in the insertion hole 14 in the stator 2 under a driving force from the drive (not shown) and revolves along the inner peripheral surface of the insertion hole 14. In other words, the rotor 3 rotates eccentrically in the insertion hole 14 in the stator 2. As viewed in the cross section of the stator 2, the rotor 3 is displaced in a reciprocating manner between two opposite ends of an opening 15, which is the cross section of the insertion hole 14. The distance of this movement is four times the eccentricity of the rotor 3 that is rotating. Such eccentric rotation of the rotor 3 transfers the fluid in the transfer spaces 16 in the longitudinal direction.

The end stud 4 is tubular and is formed from a metal material. The end stud 4 has a second opening 17 at its distal end.

The casing 1 and the end stud 4 are connected to each other with stay bolts 31. The stay bolts 31 are tightened to join the casing 1, the stator 2, and the end stud 4 with the stator 2 between the casing 1 and the end stud 4. In the joined state, a flow path is defined to extend from the first opening 7 in the casing 1 through the insertion hole 14 in the stator 2 to the second opening 17 in the end stud 4.

In the present embodiment, the stator 2 has a characteristic structure.

More specifically, in the cross section of the stator 2, the opening 15 of the insertion hole 14 has an oval (racetrack) shape, or specifically a shape including parallel straight lines and a pair of semicircles connecting the corresponding ends of the straight lines. The parallel straight lines define a middle area 18. The semicircles define two end areas 19. In the middle area 18, the rotor 3 receives lower contact pressure at least in the middle of the middle area 18 than at the two ends of the middle area 18.

Figure 3:
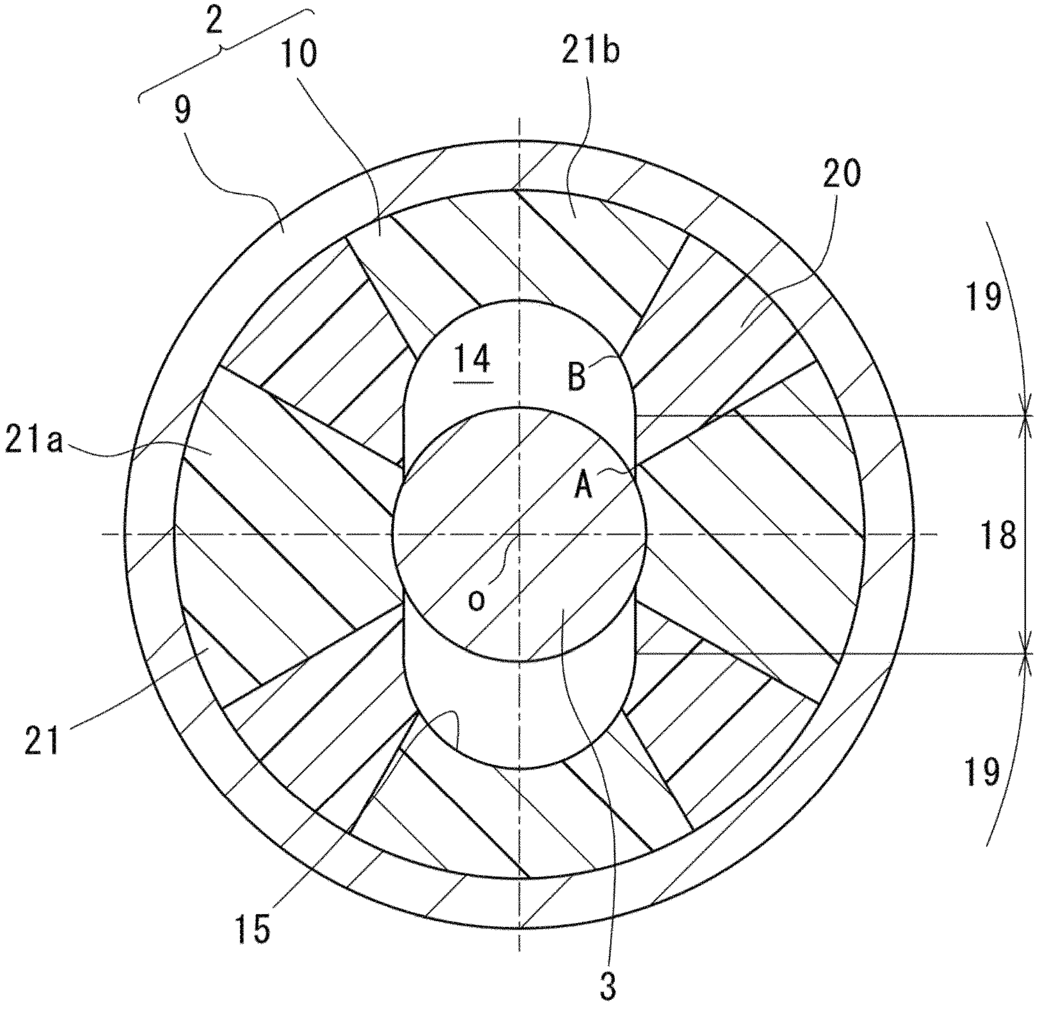
FIG. 3 is a cross-sectional view of a stator in FIG. 1 in one implementation.

FIG. 3 shows an example structure including transition areas 20 and intermediate areas 21. The transition areas 20 extend from the two ends of the middle area 18 to portions of the two end areas 19. The intermediate areas 21 are located between the transition areas 20 and include a middle portion of the middle area 18 and middle portions of the two end areas 19. Materials (e.g., elastomers such as silicone rubber) for the transition areas 20 and the intermediate areas 21 have elastic moduli different from each other. Each transition area 20 may be defined by straight lines extending through predetermined positions on the inner surface defining the opening 15. Specifically, the predetermined positions are a position A at one of the two ends of the middle area 18 and a position B in one of the two end areas 19 near the middle area. The directions in which the straight lines extend through the position A and the position B may be set as appropriate. For example, the straight lines may extend through a center O of the stator 2. The intermediate areas 21 located between the transition areas 20 and in the middle area 18 are hereafter referred to as first intermediate areas 21*a*. The intermediate areas 21 located between the transition areas 20 and in the two end areas 19 are hereafter referred to as second intermediate areas 21*b*.

The material for the transition areas 20 has a higher elastic modulus than the material for the first intermediate areas 21*a*. For example, an elastomer containing a filler (e.g., carbon black) is used for the transition areas 20 and the first intermediate areas 21*a*, with the transition areas 20 having a higher content of the filler in the elastomer than the first intermediate areas 21*a* to have a higher elastic modulus than the first intermediate areas 21*a*. The material for the second intermediate areas 21*b* has an elastic modulus that may be the same as or different from the elastic modulus of the material for either the transition areas 20 or the first intermediate areas 21*a*. The materials for the transition areas 20 and the intermediate areas 21 are bonded to each other with, for example, an adhesive. In this structure, the rotor 3 receives lower contact pressure and generates less friction in the intermediate areas 21 including the middle of the middle area 18 than in the transition areas 20 including the two ends of the middle area 18.

Instead of the above structure, any of the example structures below may be used to cause the rotor 3 to receive lower contact pressure in the first intermediate areas 21*a* than in the transition areas 20 or to receive higher contact pressure in the transition areas 20 than in the first intermediate areas 21*a*.

The transition areas 20 and the intermediate areas 21 may be formed from the same elastomer, and the inner surfaces in the first intermediate areas 21*a* alone may be coated with a coating layer. The coating layer may have a lower elastic modulus than the elastomer in the transition areas 20. The coating layer may also be formed on the second intermediate areas 21*b*.

As a manufacturing method for the stator body 10, the entire stator body 10 may be formed from a single elastomer, and the inner surfaces in the first intermediate areas 21*a* in the intermediate areas 21 alone may be coated with a coating layer. As another manufacturing method for the stator body 10, separate portions of the stator body 10 may be formed from an elastomer at least for the first intermediate areas 21*a*, a coating may be formed on the inner surfaces of these portions, and these portions may be bonded to other portions of the stator body 10.

The transition areas 20 and the intermediate areas 21 may be formed from the same elastomer, and the transition areas 20 alone may include a coating layer on their inner surfaces. The coating layer may have a higher elastic modulus than the elastomer in the intermediate areas 21.

As a manufacturing method for the stator body 10, the entire stator body 10 may be formed from a single elastomer, and a coating may be formed on the inner surfaces in the transition areas 20 alone. As another manufacturing method for the stator body 10, separate portions of the stator body 10 may be formed from an elastomer for the transition areas 20, a coating may be formed on the inner surfaces of these portions, and these portions may be bonded to other portions in the intermediate areas 21.

Both the intermediate areas 21 and the transition areas 20 may include coating layers. In this case, the coating layer in the first intermediate areas 21*a* may be formed from a material with a lower elastic modulus than the material for the coating layer in the transition areas 20, or the coating layer in the first intermediate areas 21*a* may be thinner and less rigid than the coating layer in the transition areas 20.

The transition areas 20 and the intermediate areas 21 may be formed from the same elastomer, and the elastomer in the transition areas 20 may have a greater degree of cross-linking than in the intermediate areas 21. In this case, the materials for the transition areas 20 and the intermediate areas 21 may be bonded to each other with, for example, an adhesive, similarly to the above example. The elastomer in the second intermediate areas 21*b* may have a greater degree of cross-linking.

The stator thickness may be less in the transition areas 20 than in the middle of the middle area 18 by a greater degree than in the structure shown in FIG. 3.

Figure 4:
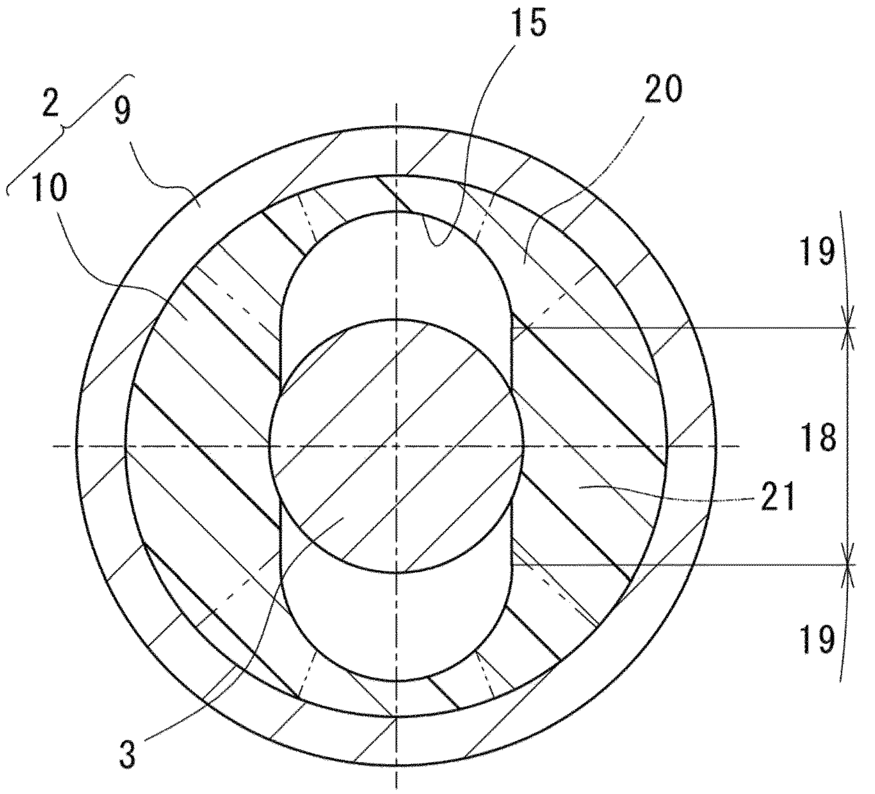
FIG. 4 is a cross-sectional view of a stator in FIG. 1 in one implementation.

FIG. 4 shows an example stator body 10 that is thinner in the transition areas 20 than in the middle of the middle area 18, with the two end areas 19 of the opening 15 located near the outer periphery of the stator body 10. As compared with the racetrack shape shown in FIG. 3, this structure has a greater difference between the stator thickness in the middle of the middle area 18 and the stator thickness at the respective ends, or boundary portions, of the two end areas 19 adjacent to the middle area 18. In other words, the stator thickness is less in the boundary portions than in the middle of the middle area 18.

Figure 5:
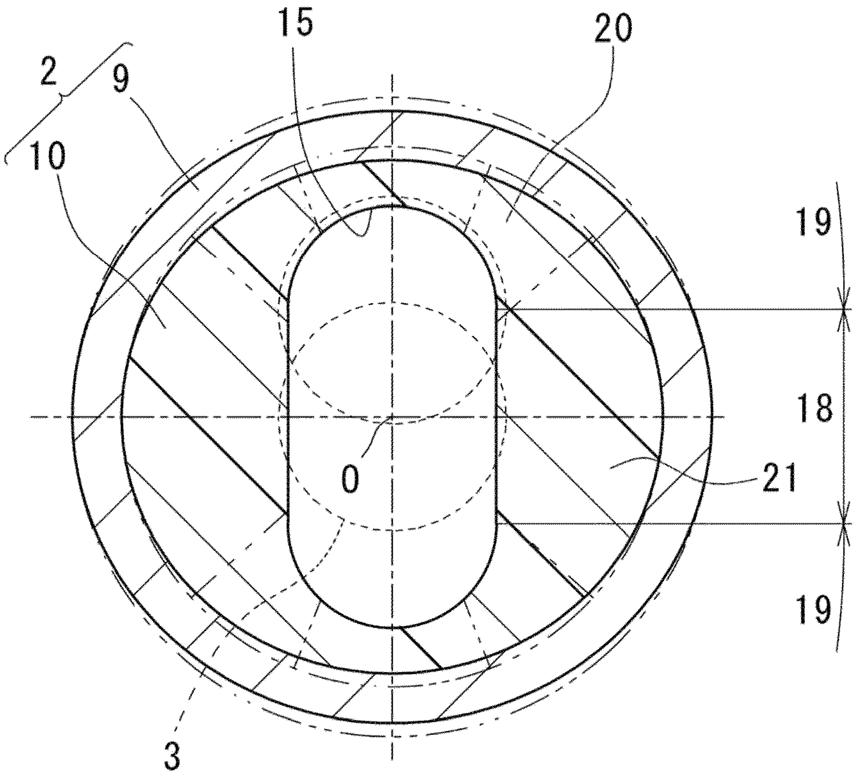
FIG. 5 is a cross-sectional view of a stator in FIG. 1 in one implementation.

FIG. 5 shows an example stator body 10 that is thinner in the transition areas 20 than in the middle of the middle area 18, with the two end areas 19 of the opening 15 located near the outer surface of the stator body 10, which has an elliptical cross section. In this example, the stator body 10 in the cross section has the major axis aligned with the horizontal axis of the perfect circle in the cross section indicated by the dot-dash line in the figure, and has a major diameter equal to the diameter of the perfect circle. This structure has a greater difference between the stator thickness in the middle of the middle area 18 and the stator thickness at the respective ends, or the boundary portions, of the two end areas 19 adjacent to the middle area 18 (portions of the two end areas 19 extending from the boundaries between the middle area 18 and the two end areas 19 by a predetermined dimension) than when the stator 2 has a cross section with the shape of a perfect circle and has, in the cross section, the insertion hole 14 with the opening shape of a racetrack including semicircles and straight lines. In other words, the stator thickness is less in the boundary portions than in the middle of the middle area 18.

In the stator body 10 shown in FIGS. 4 and 5, the transition areas 20, or particularly the boundary portions, are the areas in which the rotor 3 receives higher contact pressure. Such areas are referred to as higher contact pressure areas. With the stator body 10 guided by the hard outer cylinder 9 along its outer peripheral, the stator body 10 is more rigid in the thinner boundary portions than in the middle of the middle area 18 that is thicker and undergoes a greater amount of elastic deformation. The rotor 3 thus receives higher contact pressure in the boundary portions than in the middle of the middle area 18, achieving tighter sealing. In other words, the fluid can be delivered appropriately. Conversely, the rotor 3 has lower contact pressure in the middle of the middle area 18 than in the boundary portions. The rotor 3 thus generates less friction and uses a less driving force to rotate in the middle area 18. In this manner, the sealing tightness and the driving force for rotating the rotor 3 are adjustable as appropriate.

Although the higher contact pressure areas are the transition areas 20 in the stator body 10 shown in FIGS. 4 and 5, the higher contact pressure areas may include at least portions of the two end areas 19 adjacent to the middle area 18, or in other words, the boundary portions. The higher contact pressure areas may include a part of the middle area 18 as the transition areas 20 do, or it may not include the middle area. The higher contact pressure areas may include the entire two end areas 19. In other words, the stator body 10 may simply be thinner in the normal direction at least in the portions (boundary portions) of the two end areas 19 adjacent to the middle area 18 than in the middle area 18 in the direction of the reaction to the force applied to the rotor 3 from the stator body 10 when the rotor 3 is located in the middle area 18 (e.g., in the radial direction about the center O of the opening 15, or specifically the horizontal direction).

Figure 6:
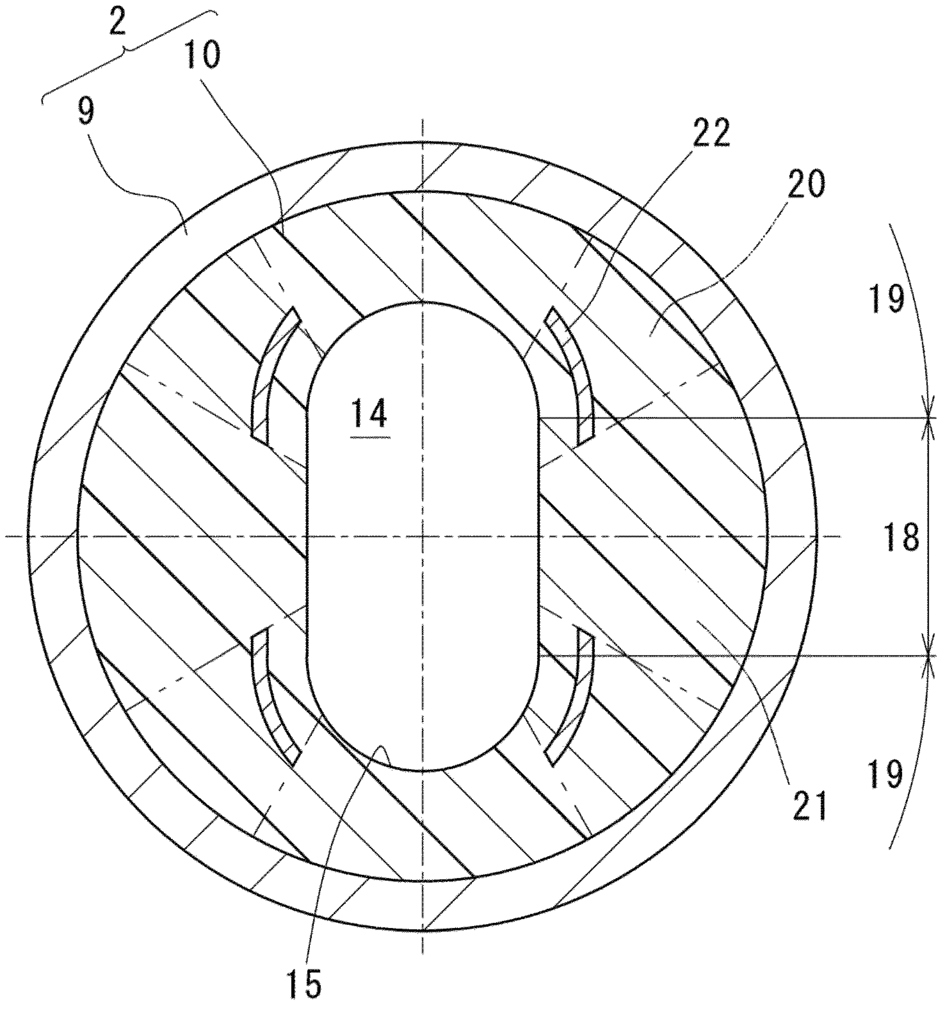
FIG. 6 is a cross-sectional view of a stator in FIG. 1 in one implementation.

FIG. 6 shows an example structure including hard members 22, such as iron plates, embedded in the member defining the two end areas 19 of the opening 15. The hard members 22 are harder than the material for the stator 2 and extend along the opening in the transition areas 20. The hard members 22 are helical along the helical insertion hole 14. The stator 2 with the hard members 22 in the transition areas 20 is less likely to deform when the rotor 3 moves in the transition areas 20. The rotor 3 thus receives higher contact pressure in the transition areas 20 than in the intermediate areas 21. This achieves tighter sealing in the transition areas 20 and appropriate delivery of the fluid.

Figure 7:
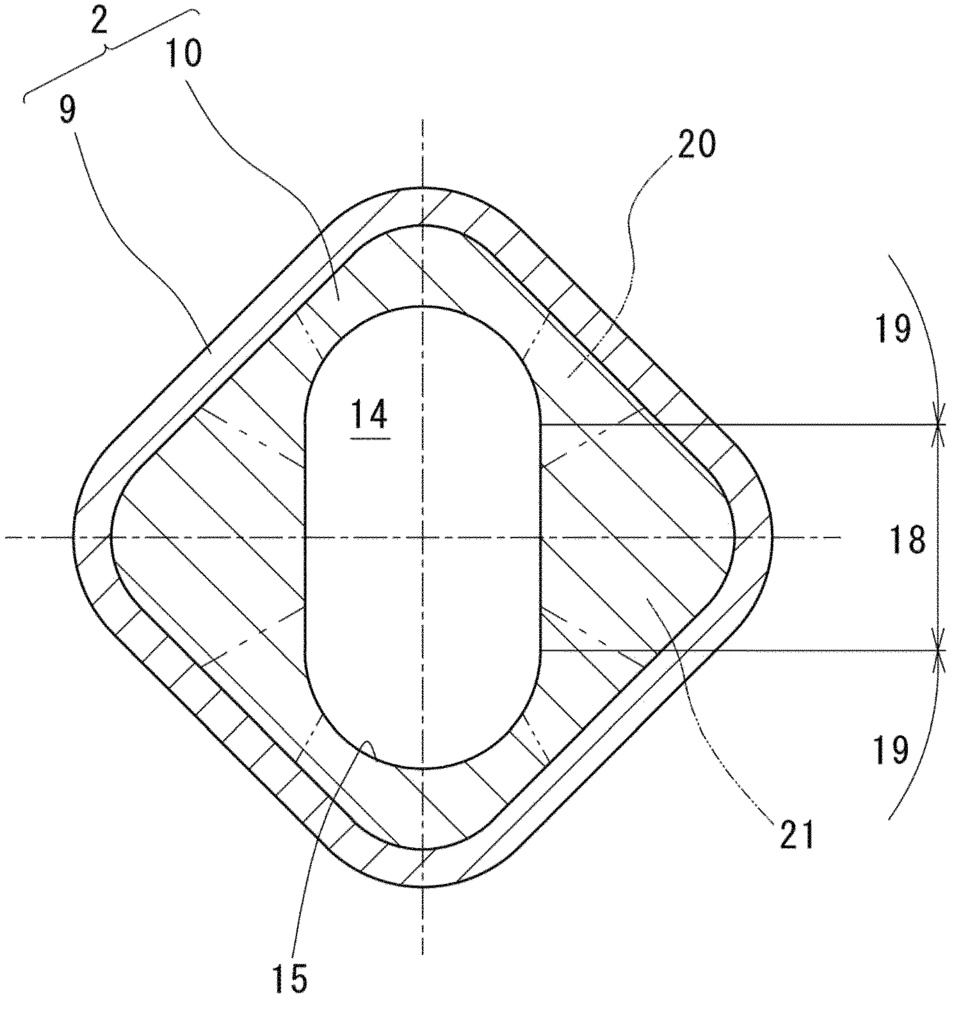
FIG. 7 is a cross-sectional view of a stator in FIG. 1 in one implementation.

FIG. 7 shows a stator body 10 that is rectangular (e.g., square) in the cross section, with the opening 15 as the cross section of the insertion hole 14 extending along a diagonal of the stator body 10. The two end areas 19 of the opening 15 extend to near corners of the stator body 10, with the stator body 10 thinner in the transition areas 20. This structure has a greater difference between the stator thickness in the middle of the middle area 18 and the stator thickness at the respective ends, or the boundary portions, of the two end areas 19 adjacent to the middle area 18 than when the stator 2 has a cross section with the shape of a perfect circle and has, in the cross section, the insertion hole 14 with the opening shape of a racetrack including semicircles and straight lines. The outer cylinder 9 is tubular and rectangular along the outer shape of the stator body 10 in the cross section.

Instead of the structure shown in FIG. 3, the structure may have tighter sealing at the respective ends, or the boundary portions, of the two end areas 19 adjacent to the middle area 18 than at least in the middle of the middle area 18.

For example, similarly to the above example, the surfaces in the boundary portions may be coated with a coating layer having a higher elastic modulus than the material in the middle of the middle area 18. In some embodiments, the surfaces in the portions other than the boundary portions may be coated with a coating layer having a lower elastic modulus than the material in the boundary portions. In some embodiments, the boundary portions and the other portions may be coated with coating layers with different elastic moduli.

Figure 8:
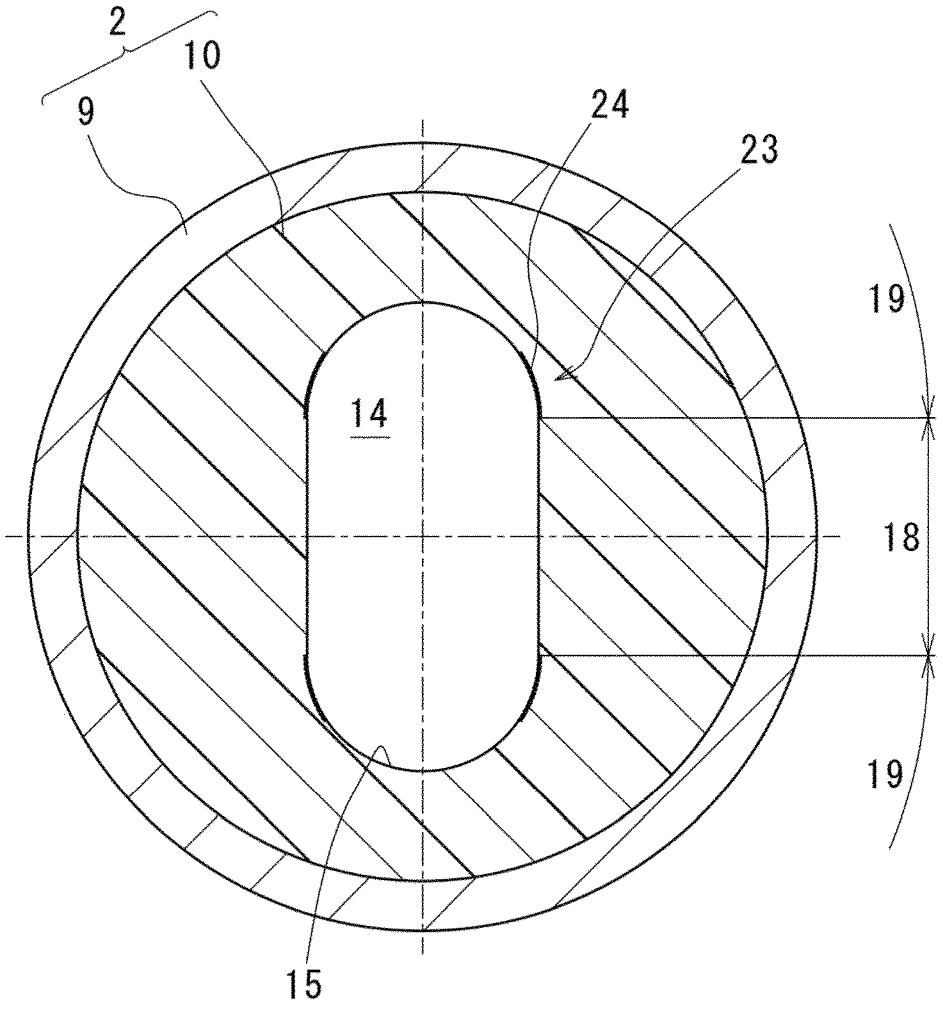
FIG. 8 is a cross-sectional view of a stator in FIG. 1 in one implementation.

FIG. 8 shows an example structure including a coating layer 24 in boundary portions 23. In this structure, the coating layer 24 can elastically deform and touch the outer peripheral surface of the rotor 3 located in the two end areas 19. In other words, the coating layer 24 in the boundary portions 23 achieves tighter sealing. The fluid can thus be delivered reliably.

Other Embodiments

The present invention is not limited to the structures described in the above embodiments and may be modified variously.

In the above embodiments, the casing 1 receives a fluid through the first opening 7 and discharges the fluid through the second opening 17. In some embodiments, the casing 1 may receive a fluid through the second opening 17 and discharge the fluid through the first opening 7 by rotating the rotor 3 in the reverse direction.

In the above embodiments, each of the two boundary portions in the two end areas 19 has higher contact pressure on the rotor 3. However, at least one of the two boundary portions may have such a structure. For example, two of the four transition areas 20 shown in FIG. 3 at diagonal positions may have a material or a thickness to have higher contact pressure on the rotor 3 than in the other two transition areas 20. This structure increases the design flexibility as appropriate for the use of the uniaxial eccentric screw pump.

Figure 9:
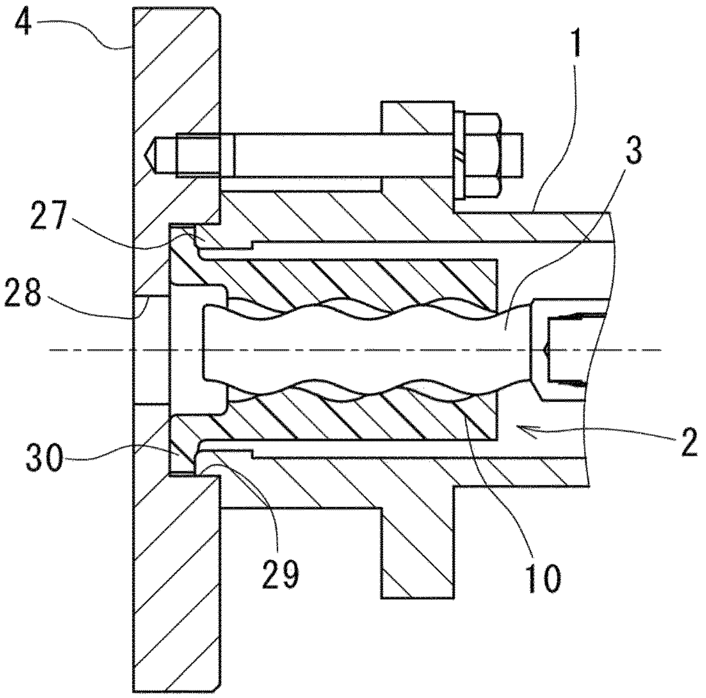
FIG. 9 is a partial longitudinal sectional view of a uniaxial eccentric screw pump according to another embodiment.

In the above embodiments, the stator 2 includes the outer cylinder 9 and the stator body 10. In some embodiments, the stator 2 may include the stator body 10 without the outer cylinder 9 as shown in FIG. 9. The casing 1 is stepped at one end and includes a radially-inward end portion 27 that is cylindrical and protruding from the end. The end stud 4 has a central hole 28 in one surface and a recess 29 surrounding the central hole 28. The stator body 10 includes a flange 30 at one end. The recess 29 on the end stud 4 receives the flange 30 on the stator body 10 and also receives the radially-inward end portion 27 of the casing 1. The end stud 4 can thus fix the stator 2 (stator body 10) with the flange 30 tightly held between the bottom surface of the recess 29 and the end face of the radially-inward end portion 27.

In this structure, the stator 2 (stator body 10) is deformable radially outward and cantilevered with the tightly held portion. This simple structure facilitates manufacture at low costs. Unlike in the above embodiments, this structure eliminates an adhesive to fix the outer cylinder 9 and the stator body 10 to each other, thus eliminating concerns about, for example, the resistance of the adhesive to the fluid.

FIGS. 10 to 16 show example stators each including a stator body 10 without an outer cylinder 9.

Figure 10:
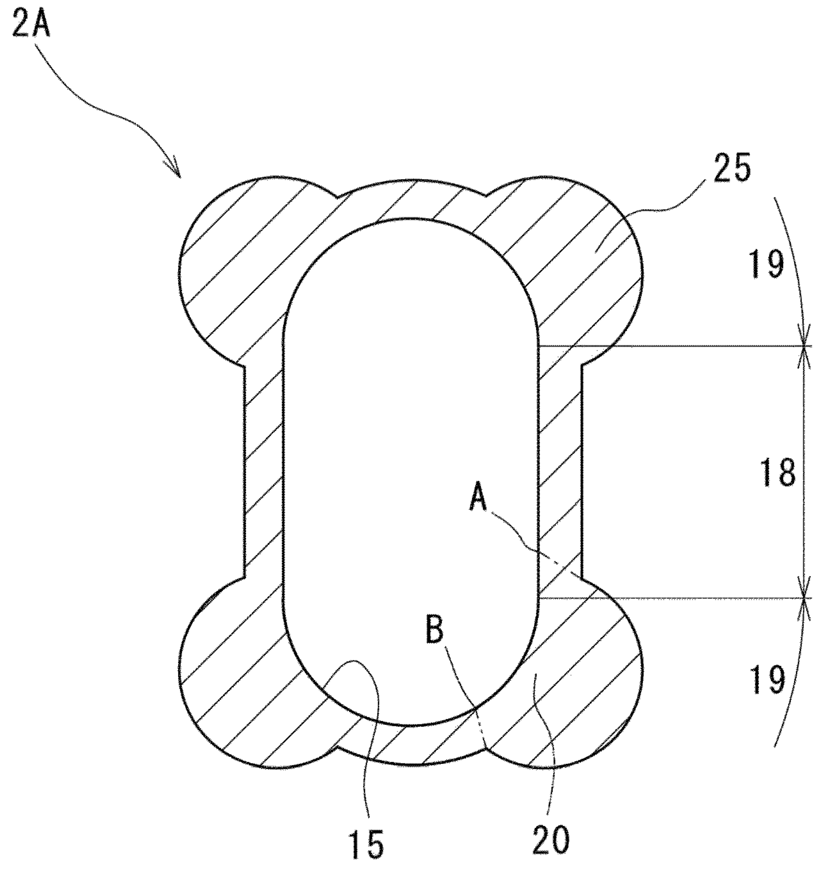
FIG. 10 is a cross-sectional view of a stator in FIG. 9 in one implementation.

FIG. 10 shows a stator 2A including circular arc protrusions 25 protruding outward at the four corners. Each protrusion 25 extends across a range (transition area 20) from a predetermined position A at one of the two ends of the middle area 18 defining the opening 15 to a predetermined position B along the corresponding end area 19.

In this structure, the middle area 18 has a less stator thickness and is more susceptible to outward deformation when the rotor 3 moves in the middle area 18 of the opening 15. In this area, the rotor 3 receives lower contact pressure and generates less friction against the stator 2A. The rotor 3 can thus move smoothly and use a reduced driving force to rotate.

The transition areas 20 have a greater stator thickness and are less susceptible to outward deformation when the rotor 3 moves in the two end areas 19 of the opening 15. In these areas, the rotor 3 receives higher contact pressure and can achieve tighter sealing for more reliable delivery of the fluid.

Figure 11:
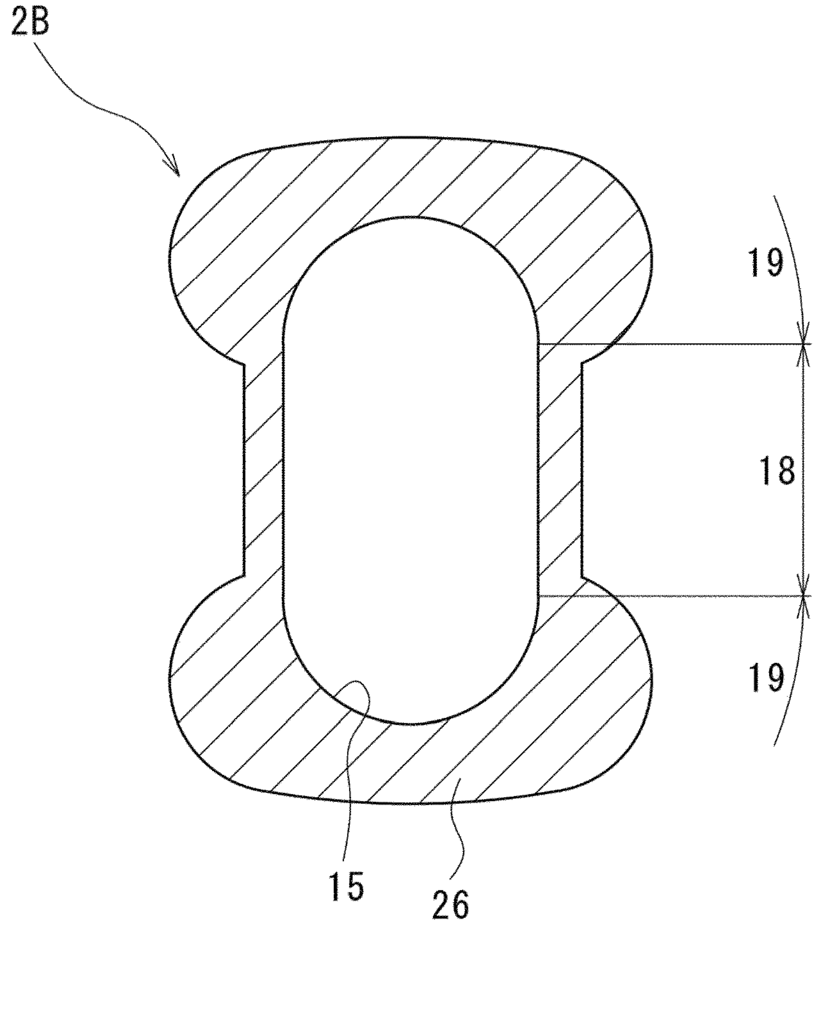
FIG. 11 is a cross-sectional view of a stator in FIG. 9 in one implementation.

FIG. 11 shows a stator 2B including extensions 26 each extending across one of two end portions of the middle area 18 and the entire corresponding end area 19. Each extension 26 corresponds to the two protrusions 25 at the corresponding end in FIG. 10 that are connected together with a circular arc having a greater curvature radius than each protrusion 25.

This structure achieves the same or similar performance as the structure shown in FIG. 10 when the rotor 3 moves in the middle area 18 of the opening 15. When the rotor 3 moves in the two end areas 19, the structure achieves tighter sealing than the structure shown in FIG. 10, allowing more reliable delivery of the fluid.

Figure 12:
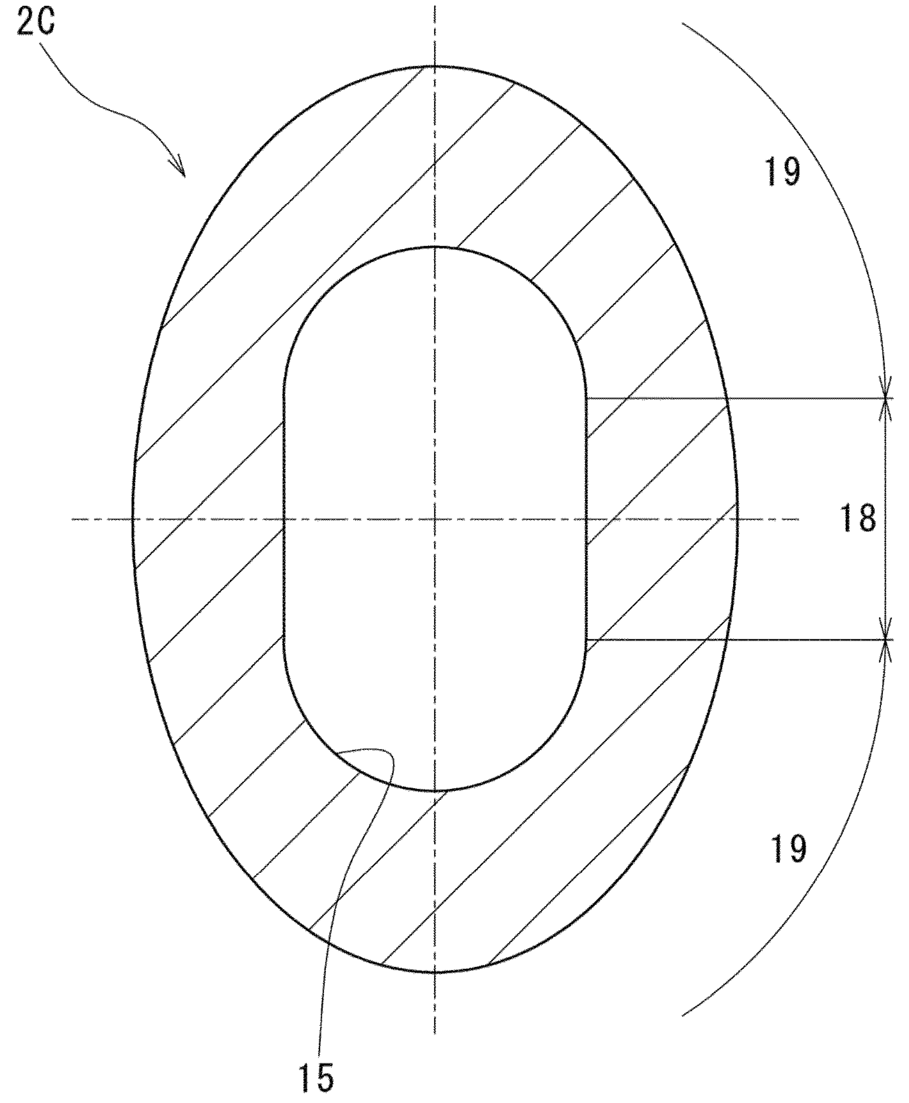
FIG. 12 is a cross-sectional view of a stator in FIG. 9 in one implementation.

FIG. 12 shows a stator 2C that is elliptical in the cross section, with the opening 15 having the shape of a racetrack elongated along the vertical axis of the stator 2C. The stator 2C has the major axis extending along the vertical axis of the opening 15 and is thicker in the two end areas 19 of the opening 15. The stator 2C is thinner in the middle area 18.

Figure 13:
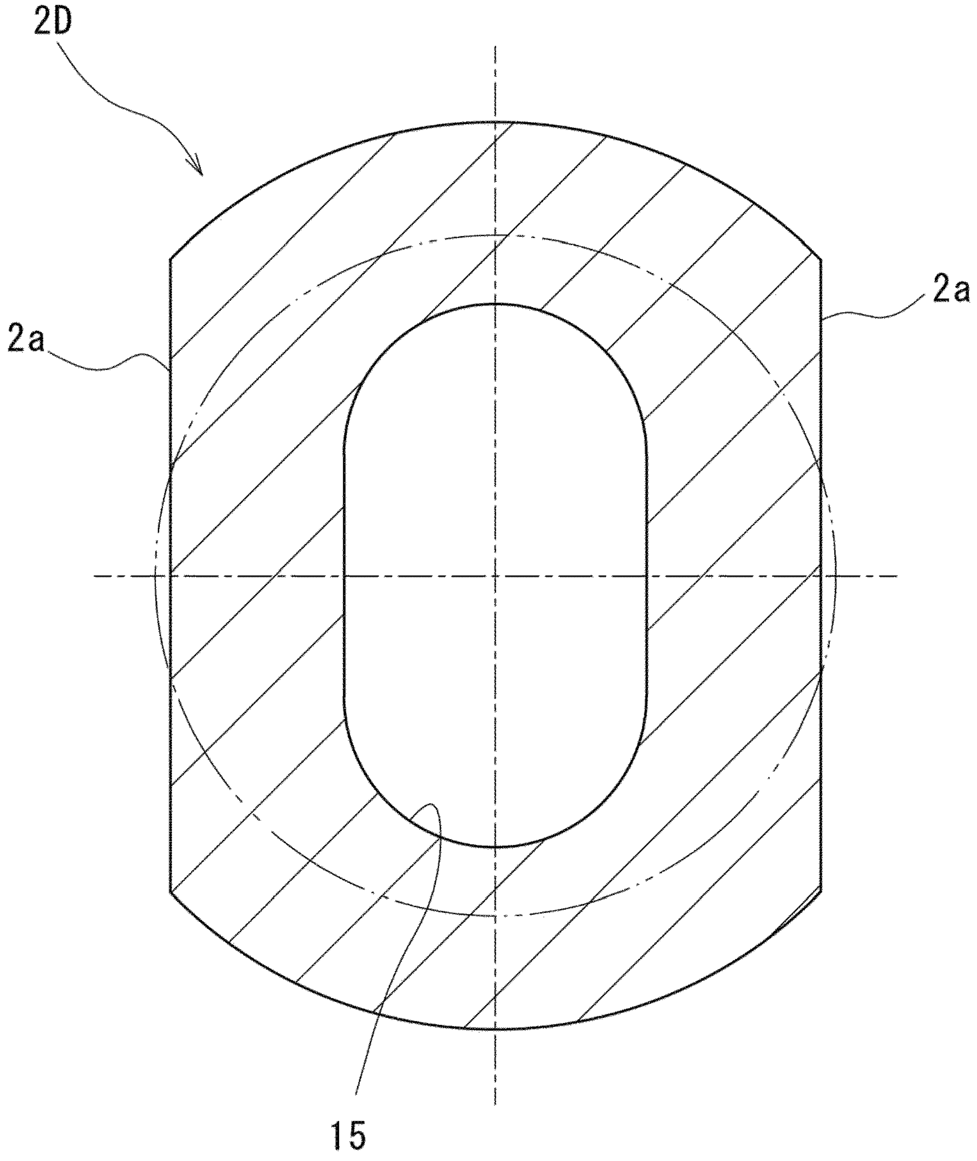
FIG. 13 is a cross-sectional view of a stator in FIG. 9 in one implementation.

FIG. 13 shows a stator 2D with the shape of a perfect circle cut away along two straight lines to have a pair of parallel chords 2*a* in the cross section. The opening 15 has two sides extending in the longitudinal direction and parallel to the chords 2*a*. As compared with the stator body 10 shown in FIG. 3 (indicated by the two-dot-dash line in FIG. 13), the stator 2D has a greater outer diameter and is thicker in the vertical direction, and is thinner in the horizontal direction with the vertical parallel straight lines.

In this structure, the stator 2 is thicker in the vertical direction and thinner in the horizontal direction relative to the opening 15. In other words, the structure achieves easy rotation of the rotor 3 in the middle area 18 and also tighter sealing in the two end areas 19.

The outer shape or the dimensions of the stator 2 may be changed variously to achieve tighter sealing in the two end areas 19 while maintaining the rotation easiness of the rotor 3 in the middle area 18, or to achieve easier rotation in the middle area 18 while maintaining the sealing tightness in the two end areas 19.

Figure 14:
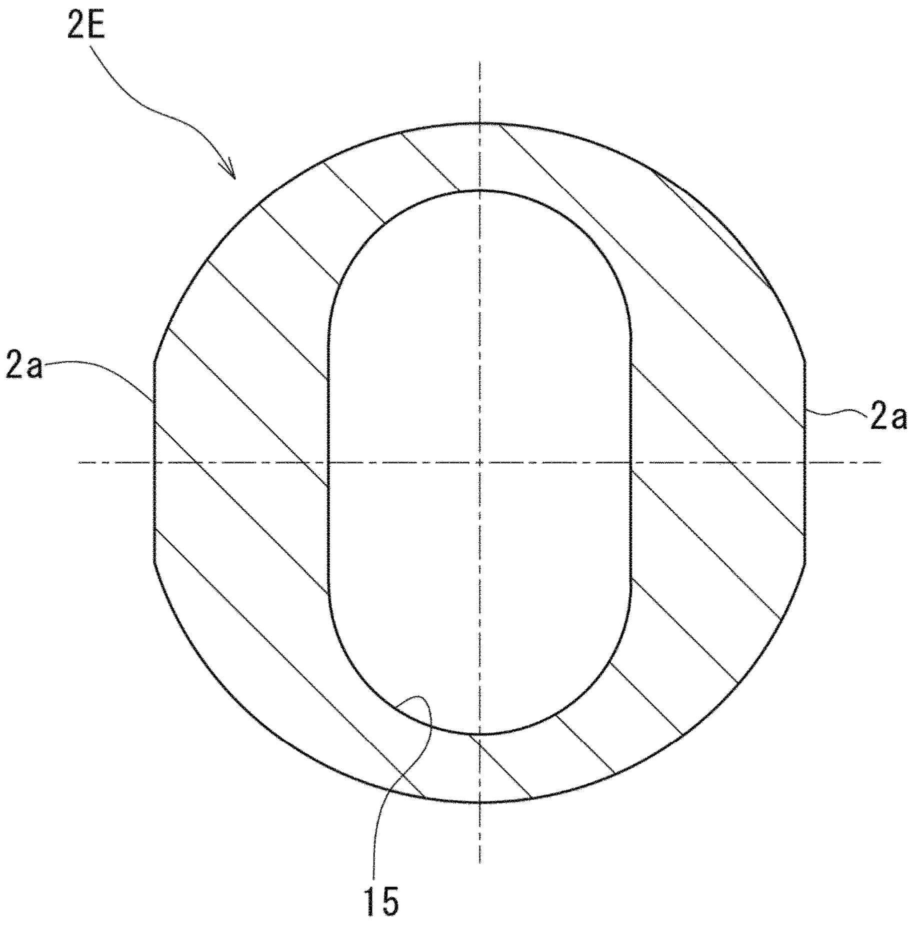
FIG. 14 is a cross-sectional view of a stator in FIG. 9 in one implementation.

For example, the structure shown in FIG. 14 may be used to achieve easier rotation in the middle area 18 while maintaining the sealing tightness in the two end areas 19. FIG. 14 shows a stator 2E with the shape of a perfect circle cut away along two straight lines to have two parallel chords 2*a* in the cross section, similarly to the stator 2D in FIG. 13. The opening 15 has two sides extending in the longitudinal direction and parallel to the chords 2*a*. The stator 2E has the pair of parallel chords 2*a* spaced from each other at an interval less than the outer diameter of the stator body 10 shown in FIG. 3, which has the shape of a perfect circle (indicated by the two-dot-dash line in FIG. 13). The stator 2E thus has the same thickness in the vertical direction as in FIG. 3 and is thinner in the horizontal direction than in FIG. 3.

This structure achieves easier rotation of the rotor 3 at the two sides in the horizontal direction while maintaining the sealing tightness in the vertical direction.

Figure 15:
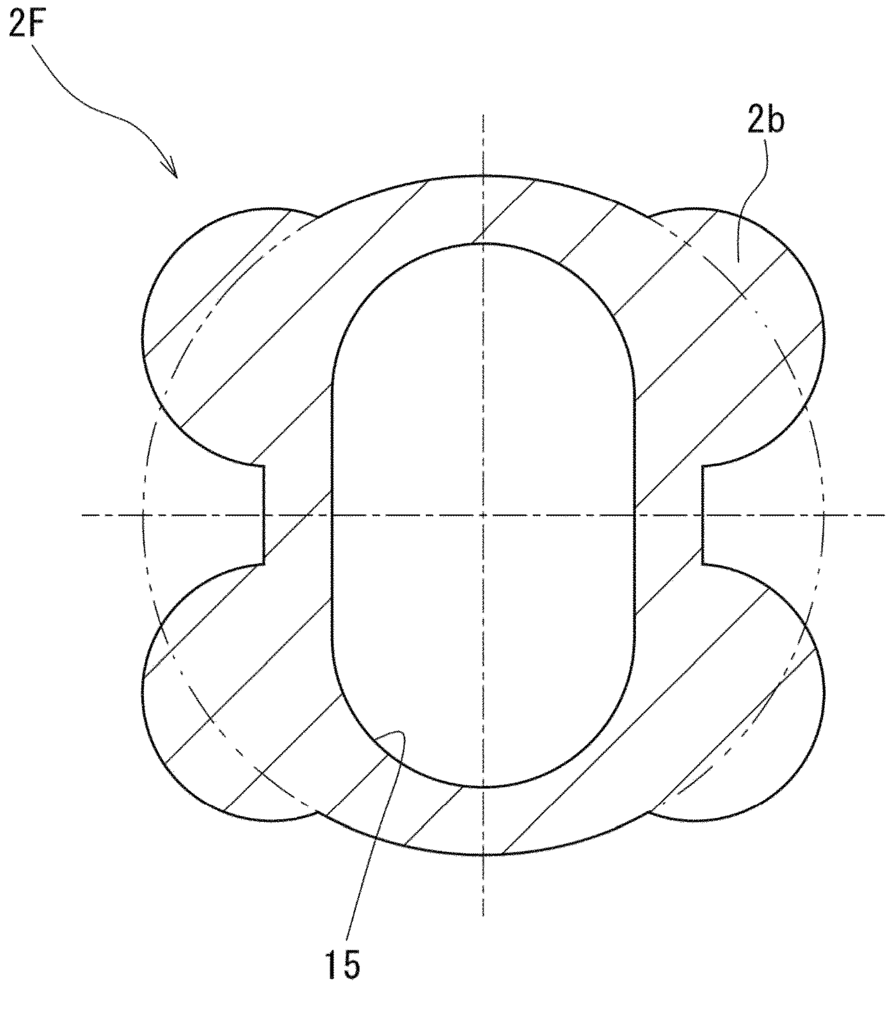
FIG. 15 is a cross-sectional view of a stator in FIG. 9 in one implementation.

FIG. 15 shows a stator 2F including a pair of parallel straight line portions and four circular arc protrusions 2*b* at diagonal positions. As compared with the stator body 10 shown in FIG. 3 (indicated by the two-dot-dash line in FIG. 15), the stator 2F has a reduced width in the pair of straight line portions and is thinner in the middle of the middle area 18 in the horizontal direction, and is thicker in the transition areas 20 with the circular arc protrusions 2*b*. In FIG. 15, each circular arc protrusion 2*b* is designed to maximize the stator thickness along the straight line connecting the center of the rotor 3 and the center of the corresponding transition area 20 when the rotor 3 is located at one of the two ends of the opening 15.

This structure achieves easy rotation of the rotor 3 in the middle area 18 and also tighter sealing in the two end areas 19, similarly to the structures shown in FIGS. 12 and 13. In particular, the stator thickness greater in the transition areas 20 achieves more reliable sealing for the rotor 3 located at any of the two ends of the opening 15.

Figure 16:
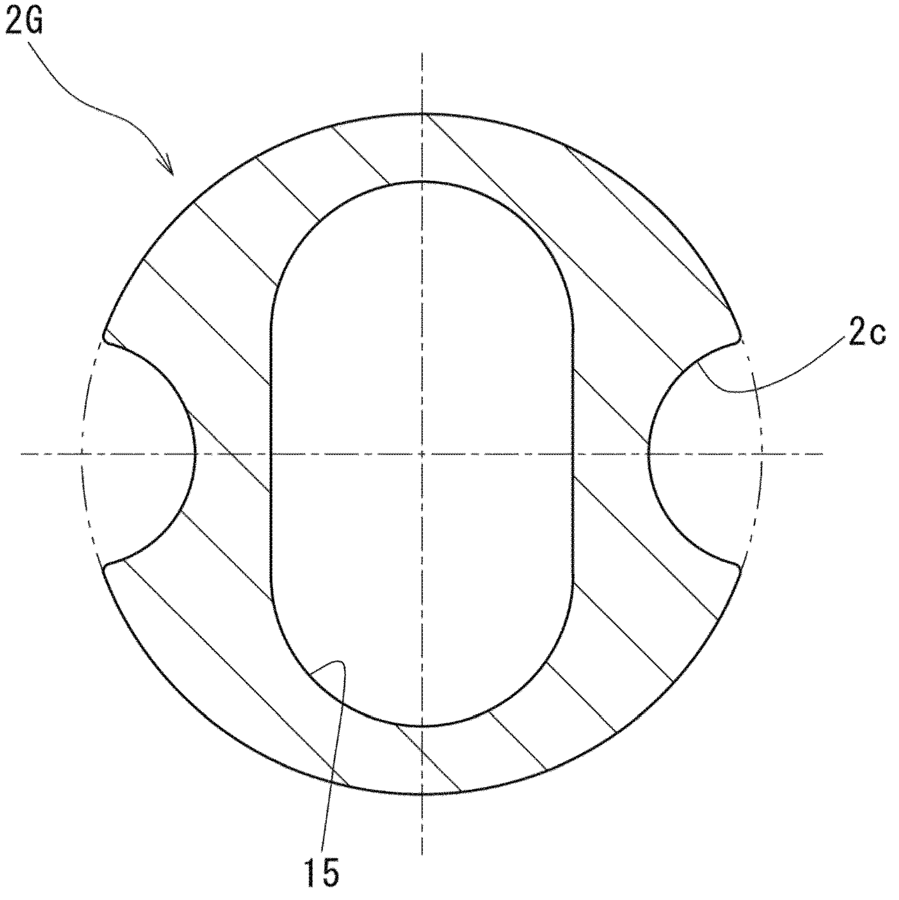
FIG. 16 is a cross-sectional view of a stator in FIG. 9 in one implementation.

FIG. 16 shows a stator 2G with circular arc cutouts 2*c* at the two sides in the horizontal direction. As compared with the stator body 10 shown in FIG. 3 (indicated by the two-dot-dash line in FIG. 16), the stator 2G is thinner in the middle area 18 with the cutouts 2*c*.

This structure achieves easier rotation of the rotor 3 in the middle area 18 while maintaining the sealing tightness in the two end areas 19.

In the above embodiments, the opening 15 as the cross section of the insertion hole 14 in the stator body 10 has the shape of a racetrack. However, this is not limitative. The opening 15 may have any other shape, such as an ellipse or a superellipse. The opening 15 may have a shape combining circular arcs, parts of ellipses, and straight lines as appropriate. When the portions of the two end areas 19 adjacent to the middle area 18 include straight lines, the stator thickness in the higher contact pressure areas refers to the thickness in the direction perpendicular to the straight lines, rather than in the normal direction.

The invention claimed is:

1. A uniaxial eccentric screw pump, comprising:
- a stator having an insertion hole with an inner peripheral surface being internally threaded; and
- a rotor including a shaft being externally threaded and placed through the insertion hole in the stator,
- wherein the stator has the insertion hole being an opening in a cross section, the opening includes a middle area and two end areas,
- the middle area has a lower elastic modulus at least in the middle of the middle area than at two ends of the middle area, and
- the middle area has lower contact pressure at least in a middle of the middle area than at two ends of the middle area.

2. The uniaxial eccentric screw pump according to claim 1, wherein
- the middle of the middle area is covered with a coating layer having a lower elastic modulus than at the two ends of the middle area.

3. The uniaxial eccentric screw pump according to claim 1, wherein the two ends of the middle area are covered with a coating layer having a higher elastic modulus than in the middle of the middle area.

4. The uniaxial eccentric screw pump according to claim 1, wherein the stator consists of a stator body made of an elastic material.

5. A uniaxial eccentric screw pump, comprising:

a stator having an insertion hole with an inner peripheral surface being internally threaded; and a rotor including a shaft being externally threaded and placed through the insertion hole in the stator, wherein the stator has the insertion hole being an opening in a cross section, the opening includes a middle area and two end areas, the middle area has a lower elastic modulus at least in the middle of the middle area than at two ends of the middle area, the two end areas include respective ends being boundary portions adjacent to the middle area, and at least one of the boundary portions has higher sealing tightness than at least a middle of the middle area.

6. The uniaxial eccentric screw pump according to claim 5, wherein the stator consists of a stator body made of an elastic material.

7. A uniaxial eccentric screw pump, comprising:

a stator having an insertion hole with an inner peripheral surface being internally threaded; and a rotor including a shaft being externally threaded and placed through the insertion hole in the stator, wherein the stator has the insertion hole being an opening in a cross section, the opening includes a middle area and two end areas, the stator has, in the cross section, a stator thickness defined between the inner peripheral surface and an outer shape of the stator, the stator consists of a stator body made of an elastic material, the outermost shape of the stator is non-circular in the cross section, so that the stator thickness in the two end areas is greater than the stator thickness in the middle area, and wherein the middle area has lower contact pressure at least in a middle of the middle area than at two ends of the middle area, and/or wherein the two end areas include respective ends being boundary portions adjacent to the middle area, and at least one of the boundary portions has higher sealing tightness than at least a middle of the middle area.

8. A uniaxial eccentric screw pump, comprising:

a stator having an insertion hole with an inner peripheral surface being internally threaded; and a rotor including a shaft being externally threaded and placed through the insertion hole in the stator, wherein the stator has the insertion hole being an opening in a cross section, the opening includes a middle area and two end areas, the stator has, in the cross section, a stator thickness defined between the inner peripheral surface and an outer shape of the stator, the stator includes a stator body made of an elastic material, the outermost shape of the stator is non-circular in the cross section, so that the stator thickness in the two end areas is less than the stator thickness in the middle area, and wherein the middle area has lower contact pressure at least in a middle of the middle area than at two ends of the middle area, and/or wherein the two end areas include respective ends being boundary portions adjacent to the middle area, and at least one of the boundary portions has higher sealing tightness than at least a middle of the middle area.

* * * * *